(12) United States Patent
Ocepek et al.

(10) Patent No.: US 11,621,975 B2
(45) Date of Patent: *Apr. 4, 2023

(54) PRIORITIZING VULNERABILITY SCAN RESULTS

(71) Applicant: International Business Machines Corporation, Armonk, NY (US)

(72) Inventors: Steven Ocepek, Cuyahoga Falls, OH (US); Nevenko Zunic, Hopewell Junction, NY (US); Tamer Aboualy, Ontario (CA); Johnny A. Shaieb, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 17/302,211

(22) Filed: Apr. 27, 2021

(65) Prior Publication Data

US 2021/0250371 A1    Aug. 12, 2021

Related U.S. Application Data

(63) Continuation of application No. 16/160,328, filed on Oct. 15, 2018, now Pat. No. 11,057,418.

(51) Int. Cl.
*H04L 29/06* (2006.01)
*H04L 9/40* (2022.01)

(52) U.S. Cl.
CPC .......... *H04L 63/1433* (2013.01); *H04L 63/20* (2013.01)

(58) Field of Classification Search
CPC ..... H04L 63/1433; H04L 63/20; H04L 63/05; H04L 63/145; H04L 63/1425; G06F 21/557

(Continued)

(56) References Cited

U.S. PATENT DOCUMENTS 9,648,036 B2 * 5/2017 Seiver .................... G06F 21/577
9,871,815 B2 ‡ 1/2018 Ouchn ................ H04L 63/1433
(Continued)

FOREIGN PATENT DOCUMENTS

CN    106096422 A ‡ 11/2016
CN    106096422 A    11/2016

OTHER PUBLICATIONS

IBM, "List of IBM Patents or Patent Applications Treated as Related," dated Apr. 27, 2021, 2 pages.
(Continued)

*Primary Examiner* — Longbit Chai
(74) *Attorney, Agent, or Firm* — Yee & Associates, P.C.

(57) ABSTRACT

Prioritizing vulnerability scan results is provided. Vulnerability scan results data corresponding to a network of data processing systems are received from a vulnerability scanner. The vulnerability scan results data are parsed to group the vulnerability scan results data by vulnerability identifiers. A corresponding security threat information identifier is associated with each vulnerability identifier. A correlation of each associated security threat information identifier is performed with a set of current vulnerability exploit data that corresponds to that particular security threat information identifier. Current security threat information that affects host data processing systems in the network is determined based on the correlation between each associated security threat information identifier and its corresponding set of current vulnerability exploit data. The current security threat information is prioritized based on a number of corresponding current vulnerability exploit attacks.

20 Claims, 5 Drawing Sheets

(58) Field of Classification Search
USPC .......................................................... 726/25
See application file for complete search history.

(56) References Cited

U.S. PATENT DOCUMENTS

| | | | |
|---|---|---|---|
| 2012/0185945 A1‡ | 7/2012 | Andres | ................... G06F 21/56 |
| | | | 726/25 |
| 2018/0124094 A1* | 5/2018 | Hamdi | ................ H04L 63/1433 |
| 2018/0137288 A1* | 5/2018 | Polyakov | .............. G06F 21/552 |
| 2020/0120126 A1 | 4/2020 | Ocepek et al. | |

OTHER PUBLICATIONS

Office Action, dated Jul. 17, 2020, regarding U.S. Appl. No. 16/160,328, 18 pages.
Final Office Action, dated Sep. 8, 2020, regarding U.S. Appl. No. 16/160,328, 18 pages.
Office Action, dated Dec. 15, 2020, regarding U.S. Appl. No. 16/160,328, 13 pages.
Final Office Action, dated Jan. 26, 2021, regarding U.S. Appl. No. 16/160,328, 18 pages.

\* cited by examiner
‡ imported from a related application

PRIORITIZING VULNERABILITY SCAN RESULTS

BACKGROUND

1. Field

The disclosure relates generally to vulnerability scanning and more specifically to prioritizing vulnerability scan results corresponding to a network of data processing systems based on exploit prevalence scoring.

2. Description of the Related Art

In computer security, a vulnerability (also known as an attack surface) is a weakness that a malicious actor, such as an attacker, can exploit to perform unauthorized actions within a computer system. To exploit a vulnerability, an attacker must have at least one applicable tool or technique that can connect to a computer system weakness. Vulnerability management is the cyclical practice of identifying, classifying, remediating, and mitigating vulnerabilities, particularly in software.

Vulnerabilities are discovered all the time and may never be eliminated entirely. Critical and high vulnerabilities comprise over 50% of the vulnerabilities in existence today. However, only relying on vulnerability scanners will yield false positives and a limited-scope view of the vulnerability issues present in a computer system.

A security threat is the potential of a significant impact resulting from an exploit of a vulnerability. An exploit is a piece of software or a sequence of commands that takes advantage of a vulnerability to cause unintended or unanticipated behavior to occur on computer software or hardware. Such behavior may include, for example, gaining control of a computer system, allowing privilege escalation, obtaining sensitive or confidential information, or executing a denial-of-service attack. The window of vulnerability is the time from when the security weakness was introduced or manifested in deployed software, to when access was removed, a security fix was available and deployed, or the attacker was disabled. Exploitability rarely changes once a vulnerability definition or signature is produced.

SUMMARY

According to one illustrative embodiment, a method for prioritizing vulnerability scan results is provided. Vulnerability scan results data corresponding to a network of data processing systems are received from a vulnerability scanner. The vulnerability scan results data are parsed to group the vulnerability scan results data by vulnerability identifiers. A corresponding security threat information identifier is associated with each vulnerability identifier. A correlation of each associated security threat information identifier is performed with a set of current vulnerability exploit data that corresponds to that particular security threat information identifier. Current security threat information that affects host data processing systems in the network is determined based on the correlation between each associated security threat information identifier and its corresponding set of current vulnerability exploit data. The current security threat information is prioritized based on a number of corresponding current vulnerability exploit attacks. According to other illustrative embodiments, a computer system and computer program product for prioritizing vulnerability scan results are provided.

DETAILED DESCRIPTION

Figure 1:
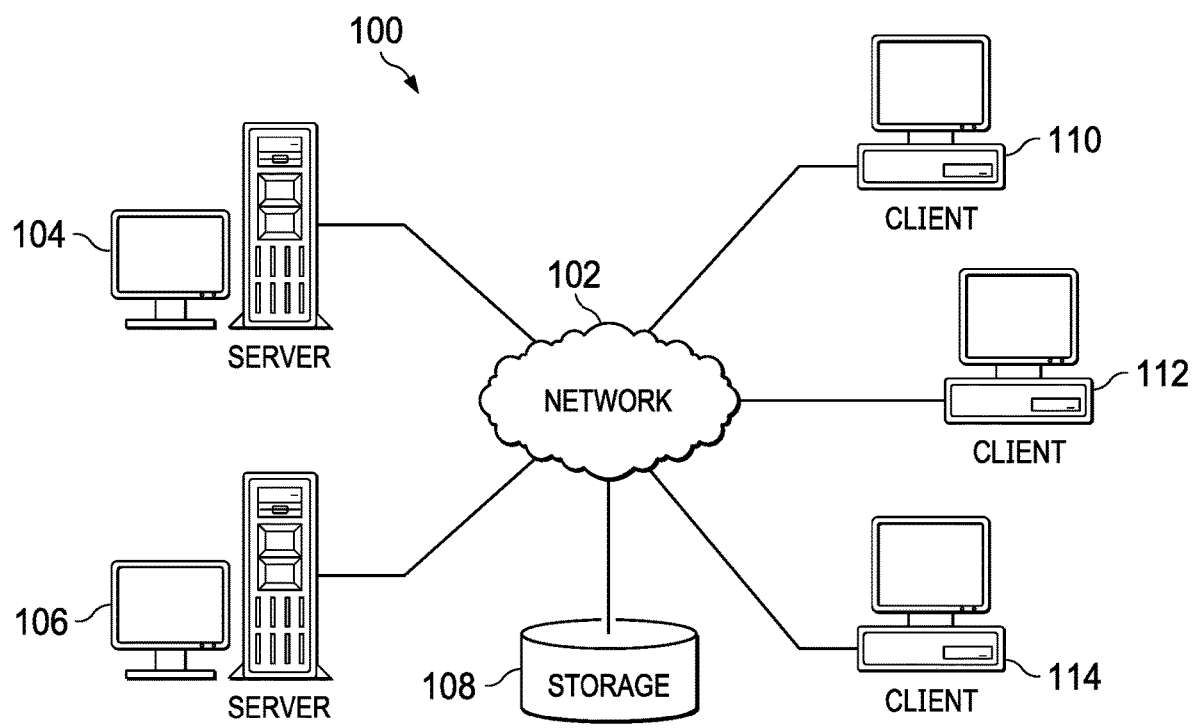
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
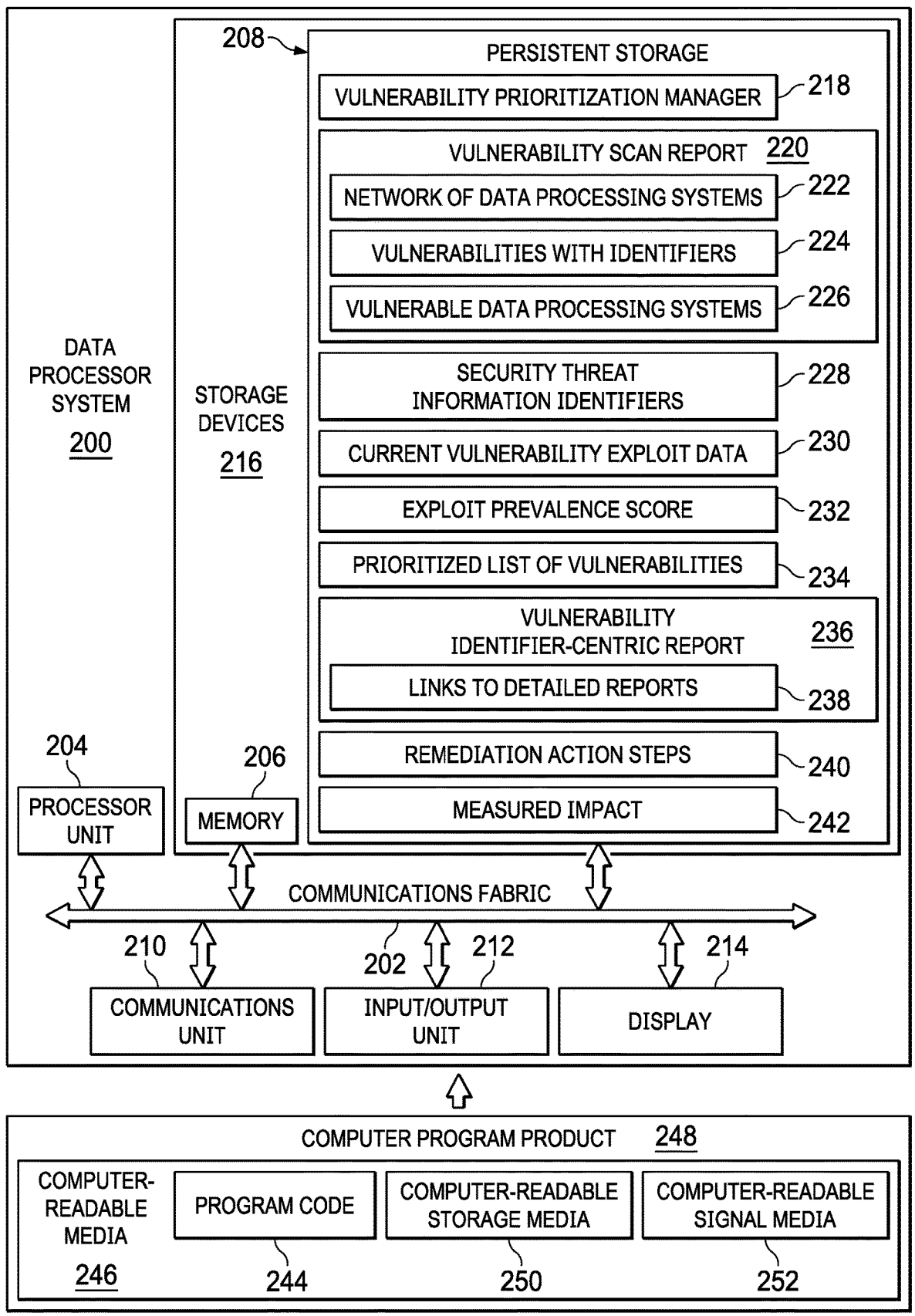
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 provide services to client devices for prioritizing vulnerability scan results. Further, server 104 and/or server 106 may include a vulnerability scanner for scanning network data processing system 100. A vulnerability scanner is a software program designed to assess computers, data processing systems, networks, and applications for known weaknesses and generate a report regarding those found weaknesses. The vulnerability scanner detects and identifies vulnerabilities relating to mis-configured resources or flawed software that resides on a network-based asset, such as, for example, a firewall, router, web server, application server, client device, and the like. However, it should be noted that server 104 or server 106 may receive a vulnerability scan report from a vulnerability scanner located on another computer connected to a different network for prioritization of vulnerability scan results.

Furthermore, server 104 and server 106 may each represent a set of one or more servers in a data center. Alternatively, server 104 and server 106 may represent computing nodes in a cloud environment that provides prioritization of vulnerability scan results services.

Client 110, client 112, and client 114 also connect to network 102. Clients 110, 112, and 114 are registered clients of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart watches, smart televisions, smart appliances, smart thermostats, sensors, Internet of Things devices, landline telephones, printers, facsimile machines, copiers, and the like, with wire or wireless communication links to network 102. In addition, users of clients 110, 112, and 114 may utilize clients 110, 112, and 114 to request the prioritization of vulnerability scan results services provided by server 104 and server 106.

Storage 108 is a network storage device capable of storing any type of data in a structured format or an unstructured format. In addition, storage 108 may represent a plurality of different network storage devices. Further, storage 108 may store network identifiers, identifiers and IP addresses for a plurality of client devices; identifiers and IP addresses for a plurality of exploit data sources, such as, for example, social networking websites and forums; vulnerability scan reports; security threat information identifiers, such as Common Vulnerabilities and Exposure (CVE) identification numbers; and the like. Furthermore, storage 108 may store authentication or credential data that may include user names, passwords, and biometric data associated with security analysts, system administrators, and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation.

In this example, persistent storage 208 stores vulnerability prioritization manager 218. However, it should be noted that even though vulnerability prioritization manager 218 is illustrated as residing in persistent storage 208, in an alternative illustrative embodiment, vulnerability prioritization manager 218 may be a separate component of data processing system 200. For example, vulnerability prioritization manager 218 may be a hardware component coupled to communication fabric 202 or a combination of hardware and software components. In another alternative illustrative embodiment, a first set of components of vulnerability prioritization manager 218 may be located in data processing system 200 and a second set of components of vulnerability prioritization manager 218 may be located in a second data processing system, such as server 106 in FIG. 1. In yet another alternative illustrative embodiment, vulnerability prioritization manager 218 may be located in one or more client devices, such as client 110 in FIG. 1, in addition to, or instead of, data processing system 200.

Vulnerability prioritization manager 218 controls the process of prioritizing vulnerability scan results, which corresponds to a network of data processing systems, based on exploit prevalence scoring. Vulnerability prioritization manager 218 receives vulnerability scan report 220 corresponding to network of data processing systems 222 from a vulnerability scanner. It should be noted that the vulnerability scanner may be located in data processing system 200, itself, or may be located in another data processing system that sent vulnerability scan report 220 to data processing system 200 for analysis and prioritization of vulnerabilities. Network of data processing systems 222 represents identifiers corresponding to a plurality of data processing systems, such as computers and other types of data processing systems, connected to a network. For example, network of data processing systems 222 may represent identifiers for computers and other data processing systems located in network data processing system 100 in FIG. 1.

In this example, vulnerability scan report 220 includes vulnerabilities with identifiers 224 and vulnerable data processing systems 226. Vulnerabilities with identifiers 224 represent a list of vulnerabilities, which includes respective identifiers and descriptions, detected by the vulnerability scanner within network of data processing systems 222. It should be noted that the vulnerability scanner, itself, generates the identifiers for the detected vulnerabilities. Vulnerable data processing systems 226 represent a set of one or more data processing systems within network of data processing systems 222 that the vulnerability scanner detected as having one or more vulnerabilities.

Vulnerability prioritization manager 218 associates each vulnerability identifier in vulnerabilities with identifiers 224 with a corresponding security threat information identifier in security threat information identifiers 228. Security threat information identifiers 228 may be, for example, CVE identification numbers. In the context of vulnerability management, a vulnerability typically has a CVE number, a Common Vulnerabilities Scoring System (CVSS) score associated with the CVE number, and an available security patch. CVE is a list of entries, each entry containing an identification number, a description, and at least one public reference for known cybersecurity vulnerabilities. CVSS assigns severity scores to vulnerabilities according to threat.

Scores range from 0 to 10, with 10 being the most severe. A security patch is a set of software patches for one or more security vulnerabilities.

Afterward, vulnerability prioritization manager 218 correlates each security threat information identifier with a corresponding subset of current vulnerability exploit data 230. Current vulnerability exploit data 230 represent information regarding how to exploit vulnerabilities that is stored or posted on a plurality of different exploit data sources, such as, for example, social media websites, personal video websites, the Dark Web, software development and sharing websites, vulnerability exploitation databases, and the like. In particular, vulnerability prioritization manager 218 determines the number of current vulnerability exploit references that exist in the plurality of different exploit data sources for each respective security threat information identifier associated with a particular vulnerability. In other words, the greater the number of current vulnerability exploit references that exist for a particular security threat information identifier, the greater the security threat to the associated vulnerability.

Vulnerability prioritization manager 218 then generates exploit prevalence score 232 for each vulnerability in vulnerabilities with identifiers 224 based on the correlation between security threat information identifiers 228 and current vulnerability exploit data 230. Based on respective exploit prevalence scores for each vulnerability, vulnerability prioritization manager 218 generates prioritized list of vulnerabilities 234. Prioritized list of vulnerabilities 234 lists vulnerabilities according to priority from highest to lowest. In other words, vulnerability prioritization manager 218 places a vulnerability having a highest exploit prevalence score first in the list and a vulnerability having a lowest exploit prevalence score last.

In addition, vulnerability prioritization manager 218 generates vulnerability identifier-centric report 236 based on prioritized list of vulnerabilities 234. Vulnerability identifier-centric report 236 includes the listing of vulnerabilities according to priority, along with corresponding vulnerability identifiers, descriptions, security threat information identifiers, exploit prevalence scores, affected data processing systems, and the like. Further, vulnerability prioritization manager 218 generates links to detailed reports 238. Links to detailed reports 238 represent hyperlinks to comprehensive information that vulnerability prioritization manager 218 generates for each vulnerability identifier in vulnerability identifier-centric report 236. Vulnerability prioritization manager 218 inserts links to detailed reports 238 in vulnerability identifier-centric report 236.

Furthermore, vulnerability prioritization manager 218 automatically performs remediation action steps 240. Remediation action steps 240 are a set of one or more procedures to mitigate security threats to vulnerable data processing systems 226 in scanned network of data processing systems 222. Remediation action steps 240 may include, for example, notifying a security analyst of critical vulnerabilities based on priority ranking, automatically blocking network traffic to resources having critical vulnerabilities, increasing security levels for accessing resources having critical vulnerabilities, and the like. Moreover, vulnerability prioritization manager 218 determines measured impact 242 of remediation action steps 240 after another vulnerability scan is run on network of data processing systems 222. Measured impact 242 represents the effect that remediation action steps 240 had on resolving or eliminating vulnerabilities on affected systems in vulnerable data processing systems 226.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system by including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Traditionally, vulnerability management is a process that involves: 1) performing scanning of a network environment using a vulnerability scanner; 2) prioritizing results of the network scan using a ranking methodology that is often supplied by the vulnerability scanner; 3) assigning remediation activities to teams that are responsible for each identified, vulnerable data processing system in the network; and 4) executing additional vulnerability scans and comparing the results with previous scan results to validate the remediation activities. However, this traditional process often encounters difficulty due to the large volume of results produced by a vulnerability scan. In a modern organization or enterprise, a set of results from this vulnerability scanning activity can include tens or hundreds of thousands of results.

Although ranking may be performed by the vulnerability scanning platform, the results are often stale, created at the time that the vulnerability definition (i.e., signature) was authored by the scanner team. Conversely, vulnerability exploitation can be dynamic, often spiking months or even years after a vulnerability is discovered. Indeed, a delay exists between publication of a vulnerability and use of a published vulnerability in exploits that are later discovered in the real world. Sometimes the connection between vulnerabilities and exploitation is immediate, but other times a vulnerability, which references a privately-reported exploit, will be discovered over time through reversing vendor software patches.

Illustrative embodiments address the gap between vulnerability prioritization by the vulnerability scanner and ideal vulnerability prioritization based on real-world vulnerability exploitation. In other words, even though a vulnerability scanner may label tens or hundreds of vulnerabilities as "critical", some of these vulnerabilities are more important than others and need to be addressed in a timely manner. Due to the time it takes for a client to address these vulnerabilities, focusing on less important vulnerabilities can severely hamper an effective security program, especially considering the rapidity of certain vulnerability exploitation campaigns by attackers. Security practitioners or analysts need timely data that prioritizes vulnerabilities effectively based on timely metrics that track current vulnerability exploitation trends.

As discussed above, current methods utilize prioritization and exploitation data that are provided within vulnerability scanner reports. It should be noted that this data may be months or years out of date. This information was generated when the vulnerability scanning vendor created the vulnerability definition or signature that was provided as an update to the vulnerability scanner. In cases where the vulnerability garners a great deal of attention by attackers, vulnerability scanner vendors may update select vulnerability definitions. However, selectively updating vulnerability definitions is inconsistent and entirely optional. Thus, security practitioners are left with a decision-making process that incorporates stale vulnerability exploitation data and any enrichment of this vulnerability exploitation data must be done manually. This represents a significant undertaking when considering that thousands of vulnerabilities may be identified by a single vulnerability scan. Consequently, security practitioners may select vulnerabilities at random or based on ease of remediation due to the vast number of vulnerability results.

Illustrative embodiments enhance vulnerability scan results by using dynamic threat information that can be retrieved and analyzed at processing time. Illustrative embodiments optimize vulnerability prioritization of a scan result based on the current threat data. By correlating the vulnerability data generated by the scanner with CVE numbers, CVSS scores, and references to these vulnerabilities in exploit data sources, such as, for example, software code sharing websites or penetration testing modules, illustrative embodiments are able to provide real-time prioritization of vulnerability remediation tasks based on current security threat indicators. Using this correlated information, illustrative embodiments are able to discover conditions where up-to-date vulnerability exploitation metrics are 10-15 times the amount listed in typical scanner-supplied results. This correlated information indicates vulnerabilities that have received a great deal of attention since discovery and assists in the prioritization of timely remediation efforts.

Illustrative embodiments generate an exploit prevalence score for vulnerabilities using an algorithm that closely matches that used by real-world attackers. Often, attackers that focus on a specific network will research various exposed services and ports and then correlate that information with known vulnerabilities. Much like a software developer, the attacker will explore the prevalence and pervasiveness of various exploit approaches. Vulnerabilities that correspond to exploit proof-of-concept code, proven exploit results, and a clear benefit path, will take precedence over more obscure vulnerabilities. Illustrative embodiments generate an exploit prevalence score for each particular vulnerability by determining the number of exploit proof-of-concept code snippets, exploitation descriptions, and exploit modules that correspond to a particular vulnerability contained within a plurality of different exploit data sources. As an optional step, illustrative embodiments may consult other data sources, such as, for example, Configuration Management Databases and Network Access Control systems, when available, to determine whether vulnerable host data processing systems are externally accessible or not, which can affect the threat profile of a particular host data processing system. Taken together, these vulnerability data points provide a cognitive threat analysis that allows security practitioners to focus on the most important vulnerability remediation tasks in priority order of real threat.

Illustrative embodiments perform correlation of vulnerability and exploit data in order to enrich vulnerability scan results against trends in exploit weaponization. First, illustrative embodiments receive, from a vulnerability scanner, vulnerability scan result data that corresponds to a network of host data processing systems. Illustrative embodiments parse the vulnerability scan result data to group the vulnerability scan result data by vulnerability identifiers, which are generated by the vulnerability scanner, and list each vulnerable host data processing system in the network as an attribute of a corresponding vulnerability identifier. In other words, each vulnerability identifier corresponds to a set of one or more vulnerable host data processing systems. It should be noted that vulnerability identifiers may differ from one vulnerability scanner to the next. Also, illustrative embodiments may re-parse the vulnerability scan result data at a later date because exploit prevalence dynamically changes over time. Further, illustrative embodiments may perform stream processing of larger vulnerability scan result data sets due to file size.

In addition, illustrative embodiments associate a security threat information identifier, such as a CVE identification number, with each vulnerability identifier. Illustrative embodiments record this security threat information identifier with the associated vulnerability identifier. Further, illustrative embodiments perform a correlation of each associated security threat information identifier with a set of current vulnerability exploit data, which correspond to that particular security threat information identifier, contained in a plurality of different exploit data sources. Any exploit data source that offers a search API, or can be mined and the exploit data stored locally, is a candidate for vulnerability exploit data search. The security threat information identifier provides a marker that illustrative embodiments utilize to denote the vulnerability being attacked per exploit. Examples of exploit data sources may include Metasploit, ExploitDB, Github, Paste sites (e.g., pastebin), Darknet malware exchanges, social media websites, Nmap modules, Open Sourced Vulnerability Databases, Packet Storm, and the like. Illustrative embodiments determine current security threat information that affects host data processing systems in the network based on the correlation of each associated security threat information identifier with a set of current vulnerability exploit data.

Moreover, illustrative embodiments may optionally perform affected host data processing system correlation against other systems that contain additional affected host information, such as Configuration Management Databases (CMDB), Network Access Control (NAC) systems, and the like, regarding corresponding vulnerability identifiers. Illustrative embodiments generate a vulnerability identifier-centric report that includes a set of correlated vulnerability exploits as a data attribute for each vulnerability identifier based on the current security threat information. This vulnerability identifier-centric report links to a detailed report that is generated for each vulnerability identifier to prevent clutter in the report. Vulnerability identifier-centric reports capture additional details of each vulnerability and all affected host data processing system information previously gathered. These linked reports are intended to be given to security practitioners who are responsible for remediation of discovered vulnerabilities. Using correlated exploit information as a guide, illustrative embodiments prioritize these vulnerability remediation activities according to real security threats.

Illustrative embodiments utilize these vulnerability results on an ongoing basis and refresh correlation data against the latest vulnerability scan results. As exploit weaponization trends change, illustrative embodiments report increases in this exploit behavior to clients. In this way, illustrative embodiments can use this exploit behavior data as a basis for a dynamic vulnerability exploit feed. Illustrative embodiments can perform this continuously on existing vulnerability scan results data in order to provide up-to-date exploit threat trending information to clients.

Figure 3:
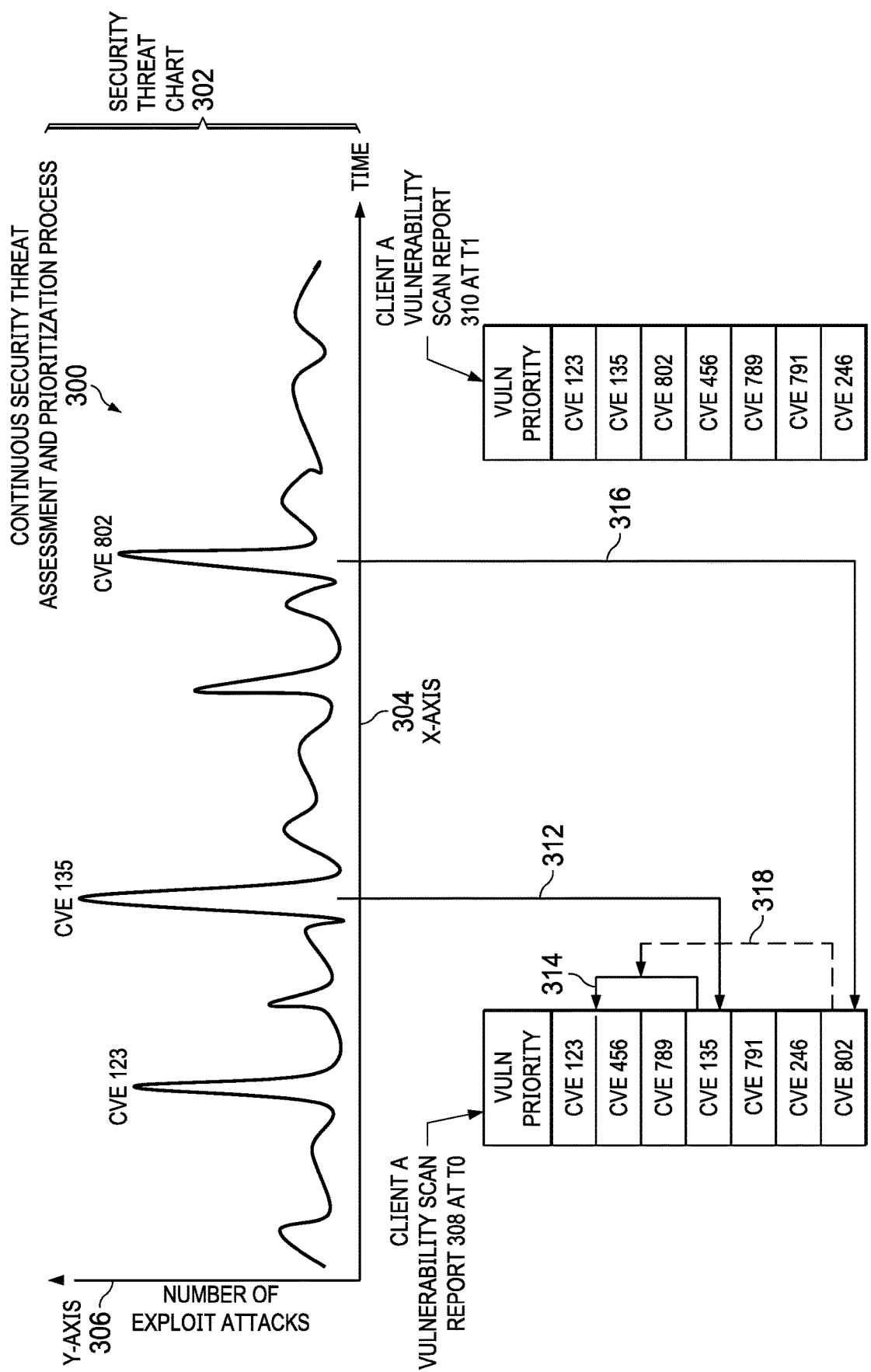
FIG. 3 is a diagram illustrating an example of a continuous security threat assessment and prioritization process in accordance with an illustrative embodiment.

With reference now to FIG. 3, a diagram illustrating an example of a continuous security threat assessment and prioritization process is depicted in accordance with an illustrative embodiment. Continuous security threat assessment and prioritization process 300 may be implemented in a network of data processing systems, such as, for example, network data processing system 100 in FIG. 1. A data processing system, such as, for example, server 104 in FIG. 1 or data processing system 200 in FIG. 2, may perform continuous security threat assessment and prioritization process 300.

Continuous security threat assessment and prioritization process 300 generates security threat chart 302. Security threat chart 302 includes X-axis 304, which represents time, and Y-axis 306, which represents number of current vulnerability exploit attacks. In addition, continuous security threat assessment and prioritization process 300 generates Client A vulnerability scan report 308 at time zero (T0) and Client A vulnerability scan report 310 at time one (T1) based on security threat chart 302.

In this example, Client A vulnerability scan report 308 at T0, lists CVE identification numbers according to vulnerability priority from highest priority at the top of the list to lowest priority at the bottom. It should be noted that the CVE numbers listed herein are just random numbers and meant as examples only. In this example, CVE 123 is listed as the highest vulnerability priority of a scanned network, followed by CVE 456, CVE 789, CVE 135, CVE 791, CVE 246, and CVE 802, which is the lowest vulnerability priority in the scanned network.

At 312, continuous security threat assessment and prioritization process 300 detects an increase in current vulnerability exploit attacks corresponding to CVE 135 based on security threat chart 302. As a result, at 314, continuous security threat assessment and prioritization process 300 moves CVE 135 up to a higher vulnerability priority level as a remediation action step. In addition, at 316, continuous security threat assessment and prioritization process 300 detects an increase in current vulnerability exploit attacks corresponding to CVE 802. Consequently, at 318, continuous security threat assessment and prioritization process 300 also moves CVE 802 to a higher vulnerability priority level. Thus, Client A vulnerability scan report 310 at T1 lists vulnerability priority order as CVE 123, CVE 135, CVE 802, CVE 456, CVE 789, CVE 791, and CVE 246.

Figure 4:
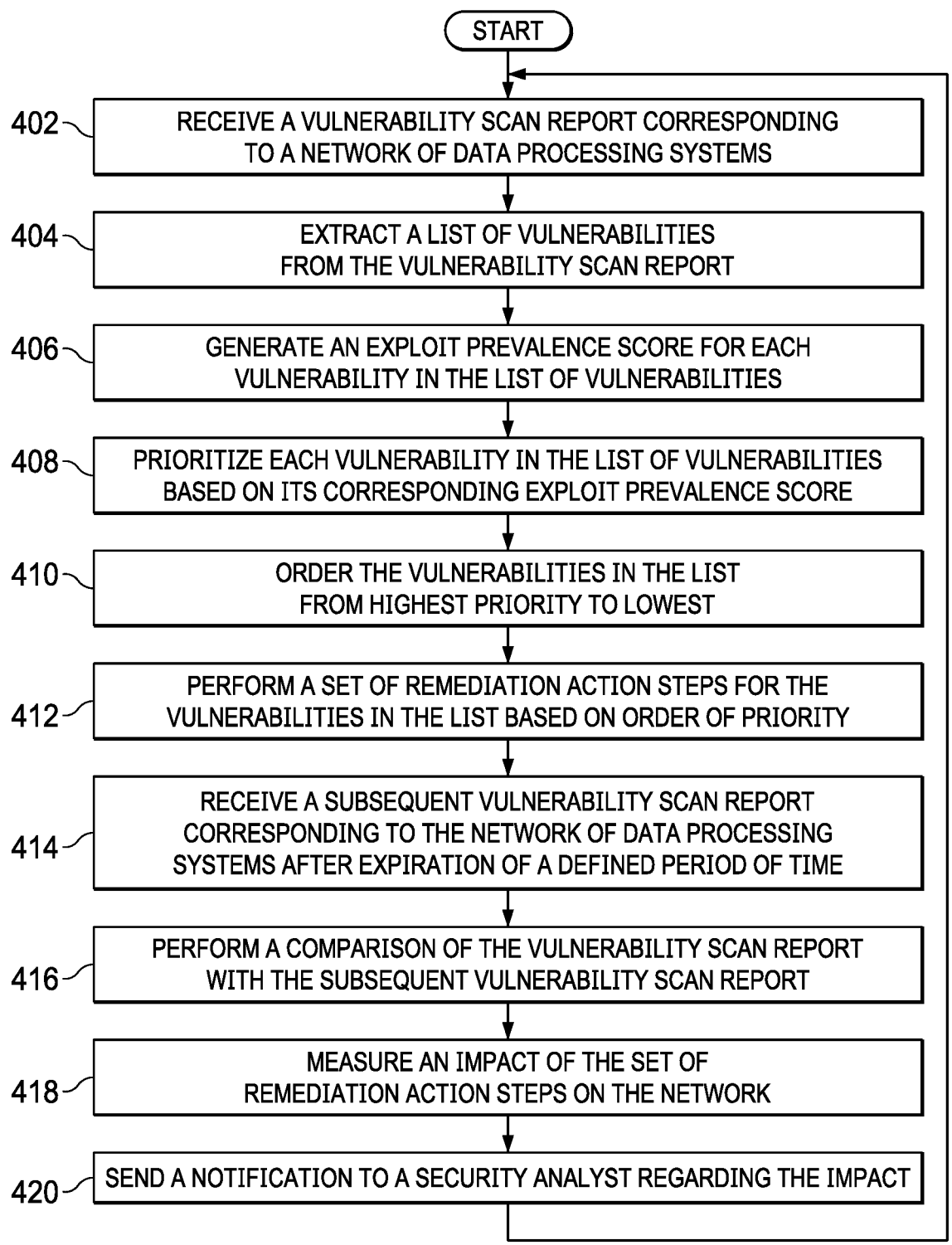
FIG. 4 is a flowchart illustrating a process for prioritizing vulnerability scan results in accordance with an illustrative embodiment.

With reference now to FIG. 4, a flowchart illustrating a process for prioritizing vulnerability scan results is shown in accordance with an illustrative embodiment. The process shown in FIG. 4 may be implemented in a computer, such as, for example, server 104 in FIG. 1 or data processing system 200 in FIG. 2.

The process begins when the computer receives a vulnerability scan report corresponding to a network of data processing systems from a vulnerability scanner (step 402). The network of data processing systems may be, for example, network data processing system 100 in FIG. 1. The vulnerability scanner may be included in the computer, itself. Alternatively, the vulnerability scanner may be included in another computer, such as, for example, server 106 in FIG. 1 or a server connected to a different network.

The computer extracts a list of vulnerabilities from the vulnerability scan report (step 404). The computer generates an exploit prevalence score for each vulnerability in the list of vulnerabilities based on a number of current exploit references, which correspond to each respective vulnerability in the list, that is contained in a plurality of different exploit data sources (step 406). The computer prioritizes each vulnerability in the list of vulnerabilities based on its corresponding exploit prevalence score (step 408). The computer orders the vulnerabilities in the list from highest priority to lowest to form a prioritized list of vulnerabilities (step 410).

The computer performs a set of remediation action steps for the vulnerabilities in the prioritized list based on order of priority (step 412). The set of remediation action steps is a set of one or more remediation steps to mitigate security threats to vulnerable data processing systems in the scanned network. The set of remediation action steps may include, for example, sending the prioritized list of vulnerabilities to security analysts, automatically blocking network traffic to critical vulnerabilities until corrected, increasing a level of authentication needed to access resources corresponding to vulnerabilities having an exploit prevalence score above a threshold until the vulnerabilities are eliminated, and the like. The computer receives a subsequent vulnerability scan report corresponding to the network of data processing systems from the vulnerability scanner after expiration of a defined period of time (step 414). The defined period of time may be, for example, a day, week, two weeks, month, or any other period of time, such as a number of minutes or hours. In other words, the vulnerability scan is performed on a regular basis. Alternatively, the vulnerability scan may be performed on demand as needed or on an irregular basis.

The computer performs a comparison of the vulnerability scan report with the subsequent vulnerability scan report (step 416). The computer measures an impact of the set of remediation action steps on the network of data processing systems based on the comparison of the two reports (step 418). The computer sends a notification regarding the impact of the set of remediation action steps to a security analyst for review and possible further action (step 420). Thereafter, the process returns to step 402 where the computer receives yet another vulnerability scan report after expiration of the defined period of time.

Figure 5:
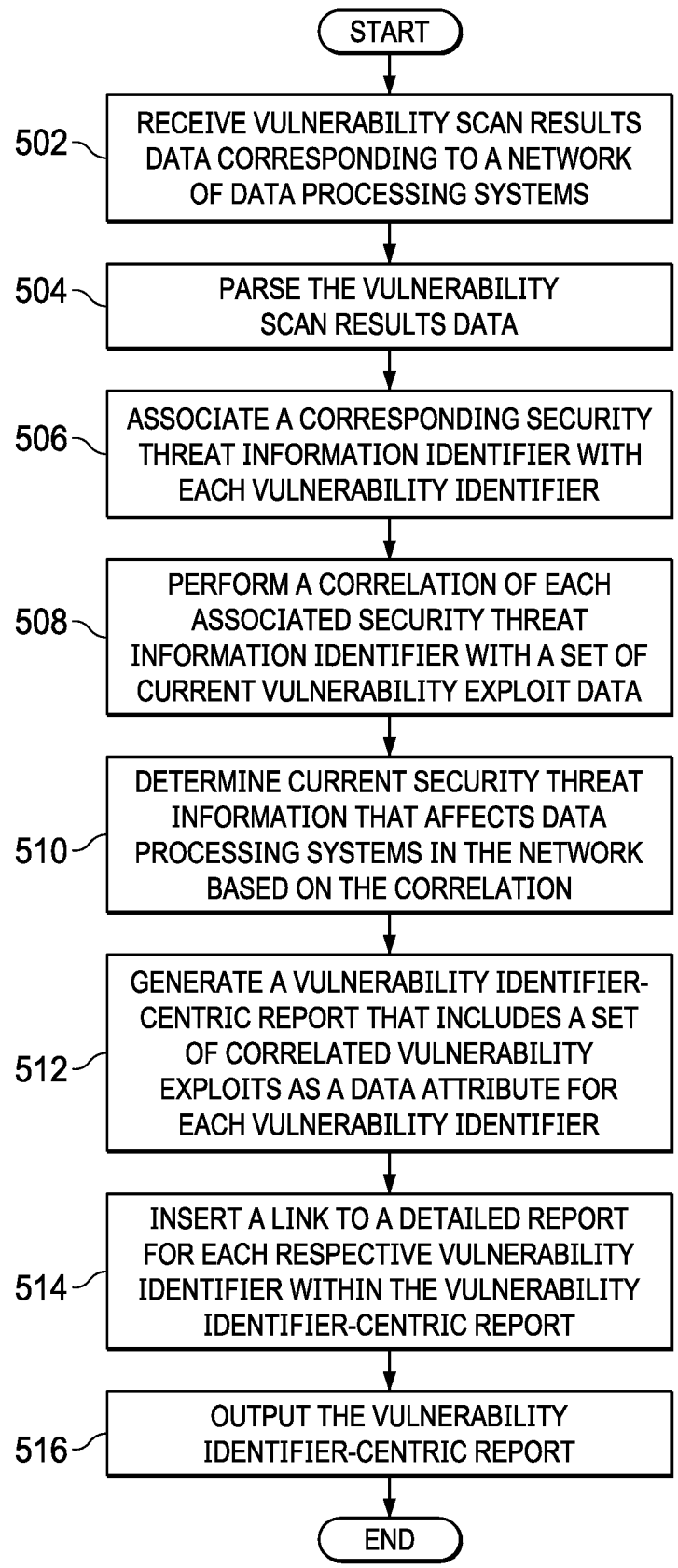
FIG. 5 is a flowchart illustrating a process for generating a vulnerability identifier-centric report in accordance with an illustrative embodiment.

With reference now to FIG. 5, a flowchart illustrating a process for generating a vulnerability identifier-centric report is shown in accordance with an illustrative embodiment. The process shown in FIG. 5 may be implemented in a computer, such as, for example, server 104 in FIG. 1 or data processing system 200 in FIG. 2.

The process begins when the computer receives vulnerability scan results data corresponding to a network of data processing systems from a vulnerability scanner (step 502). The computer parses the vulnerability scan results data to group the vulnerability scan results data by vulnerability identifiers and lists each vulnerable data processing system in the network as an attribute of a corresponding vulnerability identifier (step 504). In addition, the computer associates a corresponding security threat information identifier of a plurality of security threat identifiers with each vulnerability identifier (step 506). The security threat information identifier may be, for example, a CVE identification number.

The computer performs a correlation of each associated security threat information identifier with a set of current vulnerability exploit data, which corresponds to that particular security threat information identifier, contained in a plurality of different exploit data sources (step 508). The plurality of exploit data sources includes any database, repository, web site, online forum, and the like, that contains information on how to exploit vulnerabilities. The computer determines current security threat information that affects host data processing systems in the network based on the correlation between each associated security threat information identifier and its corresponding set of current vulnerability exploit data (step 510). The computer also prioritizes the current security threat information based on a number of corresponding current vulnerability exploit attacks.

The computer generates a vulnerability identifier-centric report that includes a set of correlated vulnerability exploits as a data attribute for each vulnerability identifier based on the current security threat information (step 512). Further, the computer inserts a link to a detailed report for each respective vulnerability identifier within the vulnerability identifier-centric report (step 514). The computer outputs the vulnerability identifier-centric report on a display of a client device, such as client 110 in FIG. 1 (step 516). Thereafter, the process terminates, Thus, illustrative embodiments of the present invention provide a computer-implemented method, computer system, and computer program product for prioritizing vulnerability scan results corresponding to a network of data processing systems based on exploit prevalence scoring. Illustrative embodiments perform scanning to discover vulnerabilities that expose sensitive Information Technology systems, validate which vulnerabilities are exploitable to eliminate false positives, automate prioritization of vulnerabilities based on whether a particular vulnerability exploit is weaponized by attackers and the value of the resource or asset at risk, and automatically perform a set of mitigation steps to mitigate security threats corresponding to a vulnerable host data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for prioritizing vulnerability scan results, the method comprising:
   receiving vulnerability scan results data with assigned vulnerability identifiers corresponding to a network of data processing systems from a vulnerability scanner;
   parsing the received vulnerability scan results data to group the vulnerability scan results data by the assigned vulnerability identifiers;
   associating a corresponding security threat information identifier with each vulnerability identifier;
   performing a correlation of each associated security threat information identifier with a set of current vulnerability exploit data that corresponds to that particular security threat information identifier and is retrieved from at least one exploit data source;
   determining current security threat information that affects host data processing systems in the network based on the correlation between each associated security threat information identifier and its corresponding set of current vulnerability exploit data; and
   prioritizing the current security threat information based on a number of corresponding current vulnerability exploit attacks identified from the at least one exploit data source.

2. The method of claim 1 further comprising:
   generating a vulnerability identifier-centric report that includes a set of correlated vulnerability exploits as a data attribute for each vulnerability identifier based on the current security threat information.

3. The method of claim 2 further comprising:
   inserting a link to a detailed report for each respective vulnerability identifier within the vulnerability identifier-centric report; and
   outputting the vulnerability identifier-centric report on a display of a client device.

4. The method of claim 1 further comprising:
   re-parsing the vulnerability scan results data, re-associating the corresponding security threat information, re-performing the correlation, re-determining the current security information, and re-prioritizing the current security threat information at a later point in time to account for exploit prevalence that dynamically changes over time.

5. The method of claim 1 further comprising:
   extracting a list of vulnerabilities from the vulnerability scan results data;
   generating an exploit prevalence score for each vulnerability in the list of vulnerabilities based on a number of current exploit references corresponding to each respective vulnerability in the list that is contained in a plurality of different exploit data sources;
   prioritizing each vulnerability in the list of vulnerabilities based on its corresponding exploit prevalence score; and
   ordering vulnerabilities in the list from highest priority to lowest to form a prioritized list of vulnerabilities.

6. The method of claim 5 further comprising:
   performing a set of remediation action steps for the vulnerabilities in the prioritized list based on order of priority.

7. The method of claim 6 further comprising:
   receiving a subsequent vulnerability scan results data corresponding to the network of data processing systems from the vulnerability scanner after expiration of a defined period of time;
   performing a comparison of the vulnerability scan results data with the subsequent vulnerability scan results data;
   measuring an impact of the set of remediation action steps on the network of data processing systems based on the comparison; and
   sending a notification regarding the impact of the set of remediation action steps to a security analyst.

8. The method of claim 1, wherein a security threat information identifier is a Common Vulnerabilities and Exposure (CVE) identification number.

9. The method of claim 1, wherein each vulnerable data processing system in the network is listed as an attribute of a corresponding vulnerability identifier, and wherein the different exploit data sources comprise exploitation descriptions and exploit modules that correspond to a particular vulnerability in the vulnerability scan results.

10. A computer system for prioritizing vulnerability scan results, the computer system comprising:
    a bus system;
    a storage device connected to the bus system, wherein the storage device stores program instructions; and
    a processor device connected to the bus system, wherein the processor device executes the program instructions to:
      receive vulnerability scan results data with assigned vulnerability identifiers corresponding to a network of data processing systems from a vulnerability scanner;
      parse the received vulnerability scan results data to group the vulnerability scan results data by the assigned vulnerability identifiers;
      associate a corresponding security threat information identifier with each vulnerability identifier;
      perform a correlation of each associated security threat information identifier with a set of current vulnerability exploit data that corresponds to that particular security threat information identifier and is retrieved from at least one exploit data source;
      determine current security threat information that affects host data processing systems in the network based on the correlation between each associated security threat information identifier and its corresponding set of current vulnerability exploit data; and
      prioritize the current security threat information based on a number of corresponding current vulnerability exploit attacks identified from the at least one exploit data source.

11. The computer system of claim 10, wherein the processor device further executes the program instructions to:
    generate a vulnerability identifier-centric report that includes a set of correlated vulnerability exploits as a data attribute for each vulnerability identifier based on the current security threat information.

12. The computer system of claim 11, wherein the processor device further executes the program instructions to:
    insert a link to a detailed report for each respective vulnerability identifier within the vulnerability identifier-centric report; and
    output the vulnerability identifier-centric report on a display of a client device.

13. The computer system of claim 10, wherein the processor device further executes the program instructions to:

re-parse the vulnerability scan results data, re-associate the corresponding security threat information, re-perform the correlation, re-determine the current security information, and re-prioritize the current security threat information at a later point in time to account for exploit prevalence that dynamically changes over time.

14. A computer program product, embodied in a non-transitory computer readable storage medium for prioritizing vulnerability scan results, having program instructions stored therewith, the program instructions executable by a computer to cause the computer to perform a method comprising:

receiving vulnerability scan results data with assigned vulnerability identifiers corresponding to a network of data processing systems from a vulnerability scanner;

parsing the received vulnerability scan results data to group the vulnerability scan results data by the assigned vulnerability identifiers;

associating a corresponding security threat information identifier with each vulnerability identifier;

performing a correlation of each associated security threat information identifier with a set of current vulnerability exploit data that corresponds to that particular security threat information identifier and is retrieved from at least one exploit data source;

determining current security threat information that affects host data processing systems in the network based on the correlation between each associated security threat information identifier and its corresponding set of current vulnerability exploit data; and prioritizing the current security threat information based on a number of corresponding current vulnerability exploit attacks identified from the at least one exploit data source.

15. The computer program product of claim 14 further comprising:

generating a vulnerability identifier-centric report that includes a set of correlated vulnerability exploits as a data attribute for each vulnerability identifier based on the current security threat information.

16. The computer program product of claim 15 further comprising:

inserting a link to a detailed report for each respective vulnerability identifier within the vulnerability identifier-centric report; and outputting the vulnerability identifier-centric report on a display of a client device.

17. The computer program product of claim 14 further comprising:

re-parsing the vulnerability scan results data, re-associating the corresponding security threat information, re-performing the correlation, re-determining the current security information, and re-prioritizing the current security threat information at a later point in time to account for exploit prevalence that dynamically changes over time.

18. The computer program product of claim 14 further comprising:

extracting a list of vulnerabilities from the vulnerability scan results data;

generating an exploit prevalence score for each vulnerability in the list of vulnerabilities based on a number of current exploit references corresponding to each respective vulnerability in the list that is contained in a plurality of different exploit data sources;

prioritizing each vulnerability in the list of vulnerabilities based on its corresponding exploit prevalence score; and ordering vulnerabilities in the list from highest priority to lowest to form a prioritized list of vulnerabilities.

19. The computer program product of claim 18 further comprising:

performing a set of remediation action steps for the vulnerabilities in the prioritized list based on order of priority.

20. The computer program product of claim 19 further comprising:

receiving a subsequent vulnerability scan results data corresponding to the network of data processing systems from the vulnerability scanner after expiration of a defined period of time;

performing a comparison of the vulnerability scan results data with the subsequent vulnerability scan results data;

measuring an impact of the set of remediation action steps on the network of data processing systems based on the comparison; and sending a notification regarding the impact of the set of remediation action steps to a security analyst.

* * * * *